Jan. 28, 1958 D. G. RENNO 2,820,993
VENTILATOR WINDOW FOR VEHICLE BODIES
Original Filed March 1, 1954
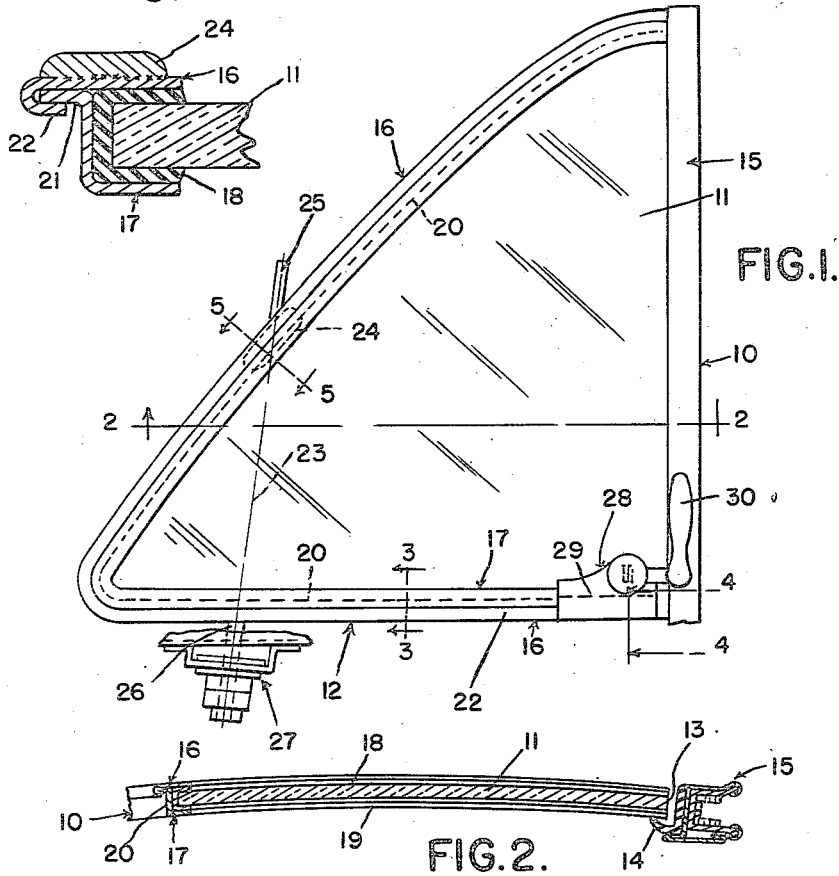
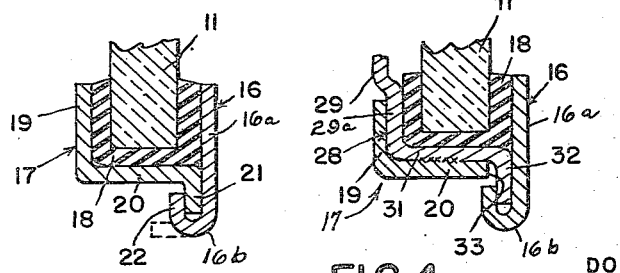
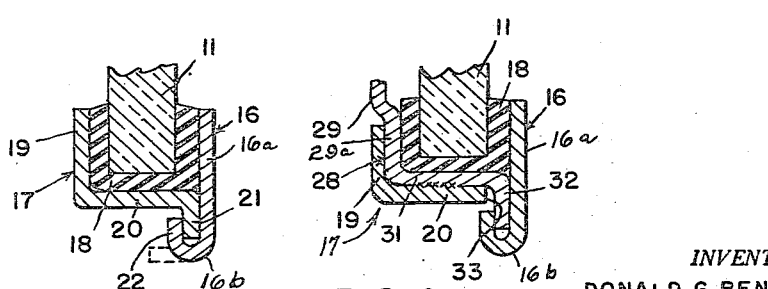
*INVENTOR.*
DONALD G. RENNO
BY
Whittemore, Hulbert & Belknap
ATTORNEYS

United States Patent Office 2,820,993
Patented Jan. 28, 1958

2,820,993

VENTILATOR WINDOW FOR VEHICLE BODIES

Donald G. Renno, Birmingham, Mich., assignor to Motor Products Corporation, Detroit, Mich., a corporation of New York Original application March 1, 1954, Serial No. 413,038. Divided and this application April 18, 1955, Serial No. 501,872

9 Claims. (Cl. 20—53)

The present invention relates to improvements in an automotive window construction, and more particularly to an improved metal frame applied to such window. As illustrated, this frame is associated with a ventilator windown panel commonly constituting a part of an automotive door structure. The present application is a division of my co-pending application, Serial No. 413,038, filed March 1, 1954.

An object of the invention is to provide a window frame unit for application to a window panel of mildly curvilinear cross section, which unit also compensates for irregularities in thickness of the panel so as to greatly facilitate the assembly of the panel and frame.

Another and more specific object of the invention is to provide a window structure of the character described having a frame of two-piece construction. The frame includes a relatively flexible frame section adapted to conform to an adjacent window panel surface regardless of variations in its thickness, with which section a further angled section coacts to form a channel to receive the window panel and sealing material applied thereto. The two frame sections may be secured together rapidly by a simple bending or crimping operation, after the winddow panel is positioned relative to one thereof. Such an improved two part frame construction is well suited for mass production of the window assemblies at a rapid rate.

As a still further object, the invention contemplates a novel and improved method of framing a window panel of the above sort. The foregoing as well as other objects will be made more apparent as this description proceeds, especially when considered in connection with the accompanying drawings, wherein:

Fig. 1 is a view in side elevation of a typical ventilator window panel having a frame in accordance with the invention applied thereto;

Fig. 2 is a fragmentary view in horizontal section along line 2—2 of Fig. 1; and Figs. 3, 4 and 5 are fragmentary views in enlarged scale on lines 3—3, 4—4 and 5—5, respectively, of Fig. 1.

The automotive ventilator window panel incorporating the improved frame of the invention is generally designated by the reference numeral 10. It comprises a transparent panel 11 of glass or other appropriate material having the frame, generally designated 12, fitted in a continuous, integral fashion to the lower horizontal and the forward, upwardly and rearwardly inclined edges thereof. The rear edge 13 of panel 11 extends vertically from the bottom of the unit and is unframed, as illustrated in Fig. 2 of the drawings. This edge is engaged by weatherstripping 14 of a ventilator upright division bar or pillar 15 to seal the window in its closed position. Frame 12 is similarly engaged by weatherstripping (not shown) to seal the same about its entire periphery when the ventilator window is closed.

As illustrated best in Figs. 3, 4 and 5, the frame 12 has an outer section 16 and an inner section 17 which extend continuously along the bottom, forward and upward margins of window panel 11, at the respective opposite sides of the latter. These two sections are connected to provide a continuous channel of generally U-shaped outline which receives the panel 11. In practice, the panel 11 is secured to frame 12 by a strip 18 of a suitable flexible sealing material, also channel-shaped in cross section, which seals the installation against the weather, while setting the transparent panel in the frame.

The inner section 17 is substantially L-shaped in cross section and is provided with a side flange 19 which overlies in surface to surface relation the inner side of the channel-shaped sealing strip, and a base portion or flange 20 underlying in surface to surface relation the base of the channel-shaped strip 18. Base portion 20 terminates in a small, outwardly turned, continuous flange or lip 21 at a right angle thereto. This lip 21 constitutes a bearing portion against which the outer frame section 16 engages when the frame structure 12 is completed in applying he same to window panel 11.

The outer and inner frame sections 16 and 17 respectively are continuous and co-extensive in length with the forward and bottom margins of panel 11, and are rigidly secured together as a unit by bending the upright portion 16a of section 16 through 90° inwardly and upwardly, as from the dotted line position of Fig. 3 to the solid line position to provide a U-shaped portion 16b. Thus the outer section 16 is substantially J-shaped in cross section and includes a crimped lip or flange 22 which grips the lip or flange 21 and rigidly secures the two sections together.

In assembling the window construction, the strip 18 of sealing material is first positioned or nested in the angle between flange 19 and base 20 of section 17, and window panel 11 is then seated in the U-shaped channel of strip 18. The edge of section 16 is then crimped at 22 in the manner described, as by a rolling operation. The sections 16, 17 of frame 12 are relatively flexible, conforming readily to the curved contour of panel 11, and regardless of variations in its thickness. Accordingly, there is no likelihood of unduly stressing the latter window panel in assembly.

A typical ventilator window as described is pivoted for swinging movement about an upright axis, designated 23 in Fig. 1, and for this purpose a bracket or mounting piece 24 equipped with an upright hinge pin 25 is secured to frame 12 at the appropriate point, as by welding. A second axially aligned hinge pin 26 is suitably secured to the bottom of frame 12, being pivotally received in a hinge unit 27 which is rigidly secured on the door of the automobile.

The ventilator structure 10 is latched in its closed position by a latch device generally designated 28 in Fig. 1. As illustrated in greater detail in Fig. 4, this comprises a bracket 29 on which an operating handle 30 is pivoted for swinging movement to and from the position of Fig. 1, in which it engages the inner side of division bar 15 to latch the window in closed position. Bracket 29 has a substantially L-shaped portion between the section 17 and the sealing strip 18. As shown, the upright portion 29a of the bracket is between and in surface to surface relation with the side flange 19 of section 17 and the inner side of the channel-shaped sealing strip 18, and the base portion 31 of the bracket is between and in surface to surface relation with the base flange 20 of section 17 and the base of the channel-shaped sealing strip. Preferably the base portion 31 is welded to the base portion 20. This base 31 of the bracket has an outwardly extending lip or flange 32 that projects outwardly through a slot 33 formed in the base portion 20, so that lip 32 thus constitutes a continuation of the frame lip or flange 21, about which the edge of frame section 16 is anchored by crimping.

What I claim as my invention is:

1. A ventilator window comprising a closure panel, a frame having first and second separate sections respectively extending along adjacent edges of the panel at opposite sides of the latter, the first frame section having a first flange which overlies the edges aforesaid of the panel and having a second flange which overlies one side of the panel, said first flange having a third flange extending laterally outwardly from the free edge thereof and having a portion of the third flange removed by an elongated slot formed in said free edge, a bracket having angularly related portions respectively seated against the inner faces of the first and second flanges and having a part extending laterally outwardly through said slot and forming a continuation of the third flange aforesaid, the second frame section having a first portion overlying the side of the panel opposite the side adjacent the second flange on the first frame section and having a second portion bearing against and secured to the third flange on the first frame section and the part aforesaid depending from the bracket.

2. The ventilator window defined in claim 1 comprising an operating handle mounted on said bracket.

3. The ventilator window defined in claim 1 wherein the second portion on the second frame section is crimped over the third flange on the first frame section and the part aforesaid on the bracket.

4. In a ventilator window assembly, a channel-shaped strip of sealing material, a transparent panel having an edge portion seated within and embraced by said channel strip, a latch device having a bracket on which an operating handle is pivoted, said bracket having a portion substantially L-shape in cross section, the upright part of said L overlying in surface to surface relation one side of said channel strip, the base of said L underlying in surface to surface relation the base of said channel strip and having an outturned flange, and framing for said strip, edge portion and portion aforesaid of said bracket having two sections, one of said sections being substantially L-shape in cross section, the upright part of said last mentioned L overlying in surface to surface relation the upright part aforesaid of the first mentioned L, the base of said last mentioned L underlying in surface to surface relation the base of the first mentioned L and having a slot receiving the outturned flange aforesaid, the base of the last mentioned L also having an outturned flange substantially in alignment with and forming a continuation of the outturned flange aforesaid, the other of said sections being substantially J-shape in cross section, the upright part of said J overlying in surface to surface relation the other side of said channel strip and both of said outturned flanges, and the U-shaped lower end of said J receiving and crimped against the free edges of both of said outturned flanges.

5. In a ventilator window assembly, a chanel-shaped strip of sealing material, a transparent panel having an edge portion seated within and embraced by said channel strip, a latch device having a bracket on which an operating handle is pivoted, said bracket having a portion substantially L-shape in cross section, the upright part of said L overlying in surface to surface relation one side of said channel strip, the base of said L underlying in surface to surface relation the base of said channel strip and having an outturned flange, and framing for said strip, edge portion and portion aforesaid of said bracket having two sections, one of said sections being substantially L-shape in cross section, the upright part of said last mentioned L overlying in surface to surface relation the upright part aforesaid of the first mentioned L, the base of said last mentioned L underlying in surface to surface relation the base of the first mentioned L and having a slot receiving the outturned flange aforesaid, the base of the last mentioned L also having an outturned flange substantially in alignment with and forming a continuation of the outturned flange aforesaid, the other of said sections having an upright part overlying in surface to surface relation the other side of said channel strip and secured to at least one of said outturned flanges.

6. In a ventilator window assembly, a channel-shaped strip of flexible sealing material, a transparent panel having an edge portion seated within and embraced by said channel strip, a latch device having a bracket on which an operating handle is pivoted, said bracket having a portion substantially L-shape in cross section, the upright part of said L overlying in surface to surface relation one side of said channel strip, the base of said L underlying in surface to surface relation the base of said channel strip and having an outturned flange, and framing for said strip, edge portion and portion aforesaid of said bracket having two sections formed of flexible material, one of said sections being substantially L-shape in cross section, the upright part of said last mentioned L overlying in surface to surface relation the upright part aforesaid of the first mentioned L, the base of said last mentioned L underlying in surface to surface relation the base of the first mentioned L and having a slot receiving the outturned flange aforesaid, the base of the last mentioned L also having an outturned flange substantially in alignment with and forming a continuation of the outturned flange aforesaid, the other of said sections being substantially J-shape in cross section, the upright part of said J overlying in surface to surface relation the other side of said channel strip and both of said outturned flanges, and the U-shaped lower end of said J receiving and crimped against the free edge of at least one of said outturned flanges.

7. In a ventilator window assembly, a channel-shaped strip of sealing material, a transparent panel having an edge portion seated within and embraced by said channel strip, a latch device having a bracket on which an operating handle is mounted, said bracket having a portion substantially L-shape in cross section, the upright part of said L overlying in surface to surface relation one side of said channel strip, the base of said L underlying in surface to surface relation the base of said channel strip and having an outturned flange, and framing for said strip, edge portion of said panel and portion aforesaid of said bracket having two sections, one of said sections being substantially L-shape in cross section, the upright part of said last mentioned L overlying in surface to surface relation the upright part aforesaid of the first mentioned L, the base of said last mentioned L underlying in surface to surface relation the base of the first mentioned L and having an outturned flange substantially in alignment with and forming a continuation of the outturned flange aforesaid, the other of said sections being substantially J-shape in cross section, the upright part of said J overlying in surface to surface relation the other side of said channel strip and both of said outturned flanges, and the U-shaped lower end of said J receiving and crimped against the free edges of both of said outturned flanges.

8. In a ventilator window assembly, a channel-shaped strip of sealing material, a transparent panel having an edge portion seated within and embraced by said channel strip, a latch device having a bracket on which an operating handle is mounted, said bracket having a portion substantially L-shaped in cross section, the upright part of said L overlying in surface to surface relation one side of said channel strip, the base of said L underlying in surface to surface relation the base of said channel strip and having an outturned flange, and framing for said strip, edge portion of said panel and portion aforesaid of said bracket having two sections, one of said sections being substantially L-shape in cross section, the upright part of said last mentioned L overlying in surface to surface relation the upright part aforesaid of the first mentioned L, the base of said last mentioned L underlying in surface to surface relation the base of the first mentioned L and having an outturned flange substantially in alignment with and forming a continuation of the outturned flange aforesaid, the other of said sections having an upright part overlying in surface to surface relation the other side of said channel strip and secured to at least one of said outturned flanges.

9. In a ventilator window assembly, a channel-shaped strip of flexible sealing material, a transparent panel having an edge portion seated within and embraced by said channel strip, a latch device having a bracket on which an operating handle is mounted, said bracket having a portion substantially L-shape in cross section, the upright part of said L overlying in surface to surface relation one side of said channel strip, the base of said L underlying in surface to surface relation the base of said channel strip and having an outturned flange, and framing for said strip, edge portion of said panel and portion aforesaid of said bracket having two sections, one being formed of flexible material, one of said sections being substantially L-shape in cross section, the upright part of said last mentioned L overlying in surface to surface relation the upright part aforesaid of the first mentioned L, the base of said last mentioned L underlying in surface to surface relation the base of the first mentioned L and having an outturned flange substantially in alignment with and forming a continuation of the outturned flange aforesaid, the other of said sections being substantially J-shape in cross section, the upright part of said J overlying in surface to surface relation the other side of said channel strip and at least one of said outturned flanges, and the U-shaped lower end of said J receiving and crimped against the free edge of at least one of said outturned flanges.

References Cited in the file of this patent

UNITED STATES PATENTS

| | | |
|---|---|---|
| 1,614,156 | Schmidt | Jan. 11, 1927 |
| 2,094,435 | Toney | Sept. 28, 1937 |
| 2,518,152 | Kramer | Aug. 8, 1950 |